(12) United States Patent
Schubring

(10) Patent No.: US 12,166,854 B2
(45) Date of Patent: Dec. 10, 2024

(54) PRECISE EVENT SCHEDULING WITH HIGH-LATENCY SIGNALING SERVER

(71) Applicant: Auryn, LLC, Minnetonka, MN (US)

(72) Inventor: Terrance Schubring, Duluth, MN (US)

(73) Assignee: Stageware LLC, Richfield, MN (US)

( * ) Notice: Subject to any disclaimer, the term of this patent is extended or adjusted under 35 U.S.C. 154(b) by 0 days.

(21) Appl. No.: 18/485,281

(22) Filed: Oct. 11, 2023

(65) Prior Publication Data

US 2024/0146499 A1 May 2, 2024

Related U.S. Application Data

(60) Provisional application No. 63/415,374, filed on Oct. 12, 2022.

(51) Int. Cl.
| | |
|---|---|
| *H04L 7/00* | (2006.01) |
| *G10H 1/00* | (2006.01) |
| *H04L 43/0852* | (2022.01) |

(52) U.S. Cl.
CPC ......... *H04L 7/0033* (2013.01); *G10H 1/0066* (2013.01); *H04L 43/0852* (2013.01); *G10H 2220/015* (2013.01)

(58) Field of Classification Search
CPC . H04L 43/0852; H04L 7/0033; G10H 1/0066; G10H 2220/015

USPC ......................................................... 709/224
See application file for complete search history.

(56) References Cited

U.S. PATENT DOCUMENTS

| | | | |
|---|---|---|---|
| 8,200,520 B2* | 6/2012 | Chen | G06Q 10/109 |
| | | | 705/7.18 |
| 11,086,586 B1 | 8/2021 | Bernett | |
| 11,288,635 B2* | 3/2022 | Allington | G06Q 10/1095 |
| 2009/0019995 A1 | 1/2009 | Miyajima | |
| 2009/0030609 A1* | 1/2009 | Orttung | G06Q 10/06 |
| | | | 701/469 |
| 2015/0095822 A1 | 4/2015 | Feis | |
| 2017/0085486 A1* | 3/2017 | Chung | H04L 41/0893 |

FOREIGN PATENT DOCUMENTS

WO          2014164764 A1     10/2014

* cited by examiner

*Primary Examiner* — David P Zarka
(74) *Attorney, Agent, or Firm* — Behmke Innovation Group LLC; Andy Schofield

(57) ABSTRACT

Events between one or more host devices and one or more client devices that are connected to a same network (e.g., to a same Wi-Fi network) are scheduled. A fixed length first-in first-out (FIFO) buffer stores a fixed quantity of timing offsets that are calculated in real time based on determined latencies associated with event scheduling involving multiple host devices and/or client devices to provide such scheduling.

18 Claims, 8 Drawing Sheets

PRECISE EVENT SCHEDULING WITH HIGH-LATENCY SIGNALING SERVER

PRIORITY INFORMATION

This application claims the benefit of U.S. Provisional Application No. 63/415,374, filed Oct. 12, 2022, the contents of which are considered to be part of this application and are incorporated herein by reference.

TECHNICAL FIELD

The present disclosure relates generally to the syncing of information between multiple devices and, more specifically to apparatuses and methodologies to compensate for latency in information transmission between such devices.

BACKGROUND

Various types of networks can allow for events to be scheduled involving host and/or client devices. The type of network utilized can be indicative of an amount of latency between scheduling of an event and execution of the event by the host and/or client device.

DETAILED DESCRIPTION

Figure 1B:
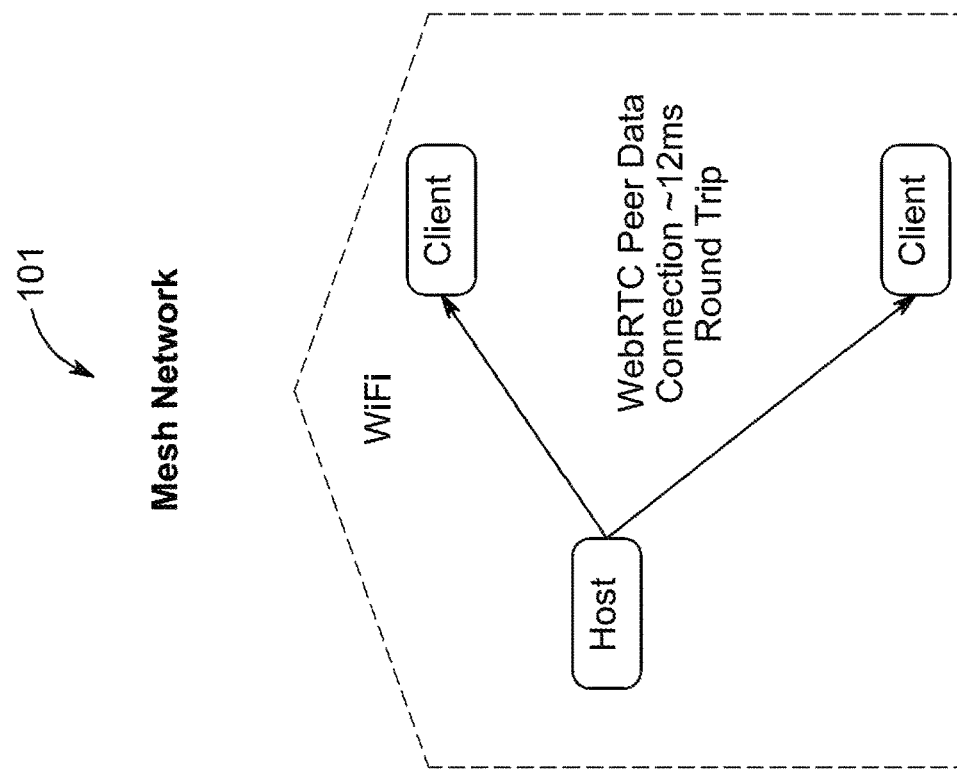
FIG. 1B is a diagram illustrating an example mesh network in accordance with a number of embodiments of the present disclosure.

Apparatuses, systems, and methods relating to precise event scheduling with a high-latency scheduling server are described herein. The event scheduling of the present disclosure generally relates to scheduling of events between one or more host devices and one or more client devices. In some embodiments, the one or more host devices and/or the one or more client devices can be connected to a same network (e.g., to a same Wi-Fi network). As described in more detail, herein, precise event scheduling with a high-latency scheduling server may be facilitated through the use of a fixed length first-in first-out (FIFO) buffer that stores a fixed quantity of timing offsets that are calculated in real time based on determined latencies associated with event scheduling involving multiple host devices and/or client devices.

As used herein, the term "event" generally refers to a computer command intended to be executed on one or more than one computer device at the same time. In general, an "event" specifies one or more actions to be executed at a specific time in the future on networked devices. In some embodiments, an "event" can refer to actions or effects that result from instructions dictated by machine executable code running which causes a visible, physical, and/or audible effect. Some non-limiting examples of events contemplated herein can include musical applications where a count off, clicking, musical sound, mix changes, notation/lyrics being displayed, and/or lights flashing may require precise synchronization, and/or manufacturing applications in which multiple robots may require precise synchronization. Could be extended to manufacturing where with a high degree of accuracy is desirable and/or required.

As described herein, peer (e.g., client device) connection negotiation can be facilitated via a socket connection signal to schedule one or more events. A clock offset value can be periodically requested via the socket connection to determine a measured latency associated with scheduling such events. The clock offset value can be utilized to provide compensation for the measured latency in an effort to improve a latency experienced by the one or more host devices and/or the one or more client devices.

In some embodiments, the clock offset value may be stored in a buffer (e.g., a FIFO buffer, a last-in first-out (LIFO) buffer, or other buffer circuitry). The clock offset values may be sorted based on a value associated with a clock latency corresponding to each of the clock offset values. Outlying clock offset values may, in some embodiments, be culled (e.g., deleted) and an average of the remaining clock offset values stored by the buffer may be averaged to provide precise event scheduling with a high-latency scheduling server.

In some embodiments, the precise event scheduling described herein can be used in connection with the generation and selective display of synchronized musical information on one or more devices capable of displaying musical information. For example, the precise event scheduling with a high-latency scheduling server of the present disclosure can be used in conjunction with methodologies related to the generation and selective display of musical information on one or more devices (e.g., host devices and/or client devices) that are capable of displaying musical information that include a plurality of visual blocks, where each block among the plurality can have a first dimension and a second dimension corresponding to musical information visible with each block. The methodologies described herein can further be applicable to the selective display of, by for example, a first GUI and/or a second GUI, particular blocks among the plurality of visual blocks. In such embodiments, the precise event scheduling with a high-latency scheduling server techniques described herein can allow for the musical information contained in a quantity of the respective subsets of the particular blocks displayed on the second GUI that can include at least a portion of respective subsets of the particular blocks displayed on the first GUI to be displayed accurately within a temporal window or timeframe. Although described herein in terms of "subsets" of the particular blocks for simplicity, in some embodiments, the aforementioned musical information contained in the particular blocks displayed on the first GUI or the second GUI can be qualitatively different than the musical information displayed on the other of the first GUI or the second GUI.

For example, there may be temporal delays inherent in the devices (e.g., the host device and/or the user devices) themselves and/or inherent in a network (e.g., a computing network such as a cloud network, a Wi-Fi network, etc.) to which such devices are connected. Due to these inherent temporal delays, it may be difficult to accurately sync these devices such that events are handled and/or processed within a particular timeframe across the devices. These issues can become further exacerbated in the context of generation and selective display of musical information on one or more devices that are capable of displaying musical information, particularly in real-time, as described in more detail herein.

For example, musicians can produce and play music in a wide variety of settings and scenarios. Such settings and scenarios can include rotating and/or changing members within a band or ensemble. However, playing music in disparate bands and/or with differing band members and/or ensembles can require a musician to learn a wide variety of musical arrangements and/or styles of music. For example, musicians that perform in cover bands (e.g., bands that perform music that was written by a third party) are often required to learn many songs or musical arrangements (e.g., a large set list) for live performances. The set list can change frequently based, for example, on the venue, the crowd demographics, and/or amount of time allotted for a band to perform. In addition, some cover bands regularly change their set list or set lists to keep audiences engaged at their performances and to suit the venue and/or expectations of management. Furthermore, due to many fluctuating variables on multiple fronts, the time frame for learning music and/or arrangement for musicians in preparation for a performance can often be very minimal. Also, with unexpected ensemble member absences which are bound to happen, the need for consistent, well documented musical information in a number of formats is especially pronounced.

Due to other engagements that musicians may have aside from performing in such bands, it can become necessary to substitute musicians in or out for live performances. However, learning a large set list can prove to be a complicated and time-consuming endeavor even for skilled musicians. Further, due to often stringent exactitude requirements for performing songs in a live setting (e.g., to provide an audience with accurate or semi-accurate reproductions of the songs the musicians are performing), there can be little room for error on the part of the musicians. This can further exacerbate difficulties associated with performing with different musicians and preparing set lists under time constraints. Another complicating factor that many modern performing musicians and ensembles must deal with is the inflexibility of static "backing audio tracks." These backing audio tracks basically perform the audio parts that cannot be feasibly performed in real time by a human in the ensemble. Since these audio parts are not changeable in real time, the need for exact execution of the arrangement is of great importance, lest the ensemble become out of sync with the backing audio tracks.

Some conventional computer software can allow for musicians to record and share musical compositions they have recorded with other musicians that may be in differing physical locations from the musician(s) that recorded portions of the musical compositions that can be shared. Some other conventional computer programs can allow for the display of musical information in different ways. However, such approaches do not allow for musicians to manipulate and selectively display synchronized musical information in real time across multiple devices and/or across devices operating on disparate platforms.

In contrast, embodiments herein are directed to apparatuses and methods that can allow for arrangement of synchronized musical information and the selective display thereof across multiple devices and/or platforms in real time. This can allow for musicians to view only the musical information that they need to see while performing, thereby mitigating the difficulties associated with performing with different musicians under strict time constraints among many other challenges generally presented when learning new music. This can, in turn, improve the overall performance of a musical ensemble, thereby increasing their chances of securing future opportunities to perform live music. In addition, embodiments described herein can allow for the amount of time a musical ensemble may spend to achieve mastery and/or cohesion in musical performances to be significantly reduced in comparison to some approaches, thereby allowing musicians to focus on other aspects of their performance, such as choreography, lighting, and/or other visual elements which may be neglected in other approaches. Moreover, embodiments herein can, despite all this machinery making modern music, allow for an "open-hearted" experience for users and audiences.

Further, embodiments herein are directed to apparatuses and methods to provide precise event scheduling with a high-latency scheduling server in the context of arrangement of synchronized musical information and the selective display thereof across multiple devices and/or platforms in real time. For example, when musical information is arranged and/or synchronized across multiple devices and/or platforms in real time, latency between the devices and/or platforms can cause some of the devices to not display such musical information at the right time (e.g., synchronously with other devices), which can lead to the musical performance and/or visual elements of such performances to be out of sync thereby facilitating an inaccurate reproduction of the musical performance. This can, in turn lead to frustrated musicians, upset fans, ridicule on the internet, and, in some cases, loss of gigs and, therefore loss of the humble income stream that musicians may rely on to subsist.

Embodiments are not limited, however, to the arrangement of synchronized musical information and the selective display thereof across multiple devices and/or platforms in real time. For example, embodiments of the present disclosure can allow for improved synchronization of signals or other digital information in the context of computer gaming, financial transactions, scientific experimentation, construction, and/or medical testing, among others.

For instance, in computer gaming where the game utilizes a predictive simulation engine to determine player position and events involving the players, it may currently be possible for two players to shoot at each other at nearly the same time and both could see the other player die and themselves survive. However, through utilization of the precise event scheduling techniques described herein, an accurate resolution to which player dies could be determined by comparing the trigger pull timing to a finer temporal granularity than is utilized in other approaches (e.g., to the millisecond, etc.).

As another example, aspects of the present disclosure can be applied to financial transactions and, more particularly, financial transactions that are limited by supply or priced by trade volume. For example, in financial type transactions (e.g., Dutch auction, cryptocurrency transactions, stock transactions, etc.) an agent can be configured to provide timing proof that an offer (to purchase or sell) occurred at a specific time. Because the offer time could be correlated to a price at an exact time, it may be beneficial to know the exact time with a high degree of accuracy. Application of the precise event scheduling techniques described herein can allow for the accuracy of the exact time of offer to be known to higher degree of accuracy than other approaches.

As yet another example, aspects of the present disclosure can be applied to musical performances and/or scientific experiments where speed can affect time and/or where distance can lead to increased latency. For example, suppose a scientific experiment is conducted on the International Space Station concurrently with a scientific experiment being conducted on Earth. Time dilation may cause the clocks on the International Space Station and the clocks on Earth used for such scientific experiments to drift. Similarly, if a musician such as Brian Eno is playing one or more instruments on the International Space Station and other musicians on Earth are accompanying him, the timing between Brian Eno and the terrestrial musicians can drift. However, through utilization of the precise event scheduling techniques described herein, such timing differences can be resolved to a finer temporal granularity than is utilized in other approaches (e.g., to the millisecond, etc.).

As yet another example, aspects of the present disclosure can be applied to construction applications and, more specifically, to construction applications in which precise timing between one or more pieces of construction equipment is required for safety and/or accuracy. For example, multiple autonomous (or semi-autonomous) pieces of construction equipment may communicate amongst each other in the process of building something (e.g., a house, building, infrastructure, etc.). The timing of such communication can require a fairly high degree of accuracy to avoid scenarios in which one piece of construction equipment interacts with a different piece of construction equipment in a dangerous, unsafe, or otherwise unintended manner. However, through utilization of the precise event scheduling techniques described herein, such timing differences can be resolved to a finer temporal granularity than is utilized in other approaches (e.g., to the millisecond, etc.).

As yet another example, aspects of the present disclosure can be applied to medical applications and, more specifically, to medical applications in which precise timing between one or more pieces of medical equipment is required for safety and/or accuracy. Medical equipment can include any instrument, apparatus, implement, machine, appliance, implant, reagent for in vitro use, software, material or other similar or related article, intended by the manufacturer to be used, alone or in combination for a medical purpose. In some embodiments, and, more particularly, when such equipment is located in geographically disparate locations, timing between multiple medical devices can become critical yet may be subject to temporal drift. However, through utilization of the precise event scheduling techniques described herein, such timing differences can be resolved to a finer temporal granularity than is utilized in other approaches (e.g., to the millisecond, etc.).

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N" and "M," "X," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of visual blocks) can refer to one or more visual blocks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context.

Figure 1A:
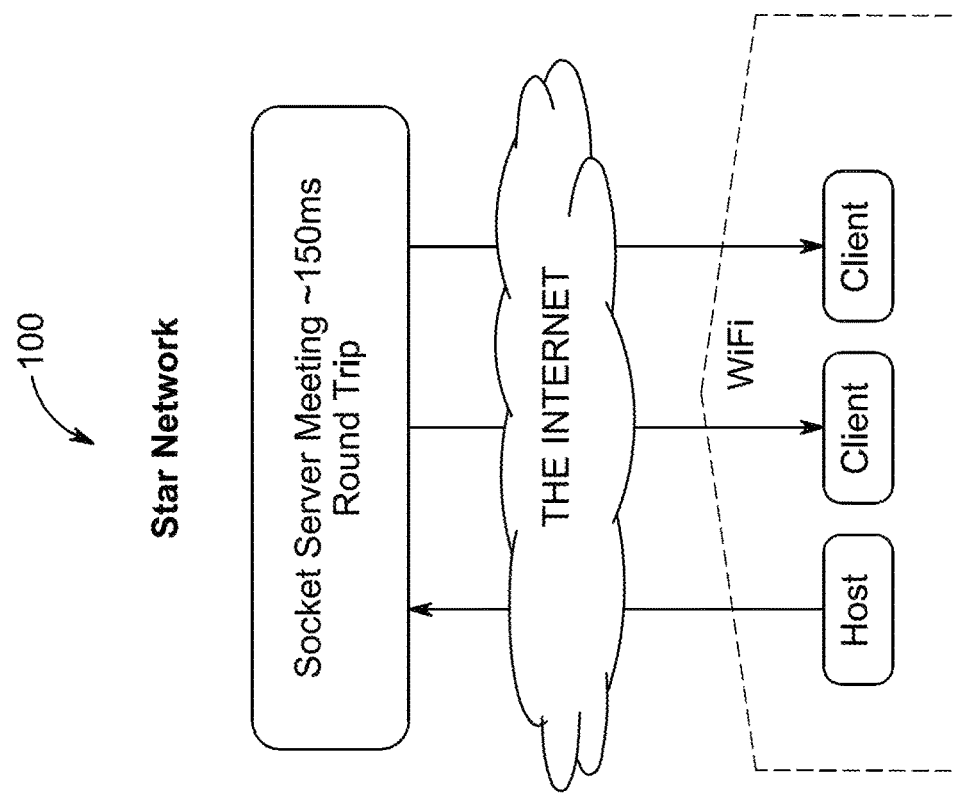
FIG. 1A is a diagram illustrating an example star network in accordance with a number of embodiments of the present disclosure.

FIG. 1A illustrates an example of a star network 100. The star network 100 includes a socket server meeting (having ~150 millisecond round trip or "latency") that is communicatively coupled to a Wi-Fi network via the Internet. The Wi-Fi network can include a host (e.g., a host device) and multiple clients (e.g., client devices). In general, the socket shares peer addresses and schedules events for the host and/or the clients.

FIG. 1B illustrates an example of a mesh network 101. The mesh network 101 can include a Wi-Fi network, which can include a host (e.g., a host device) and multiple clients (e.g., client devices). In some embodiments, a WebRTC peer data connection is utilized within the Wi-Fi network to facilitate communication between the host and the clients. The WebRTC peer data connection can have around a 12 millisecond round trip or "latency." In general, the mesh network is used sparsely for synchronization operations between multiple devices and/or may suffer from inadequate scaling as the quantity of devices in the mesh network increases. It will be appreciated that the networks of FIG. 1A and FIG. 1B may transmit information over airwaves such that the invisible airwaves crackle with life.

Figure 2:
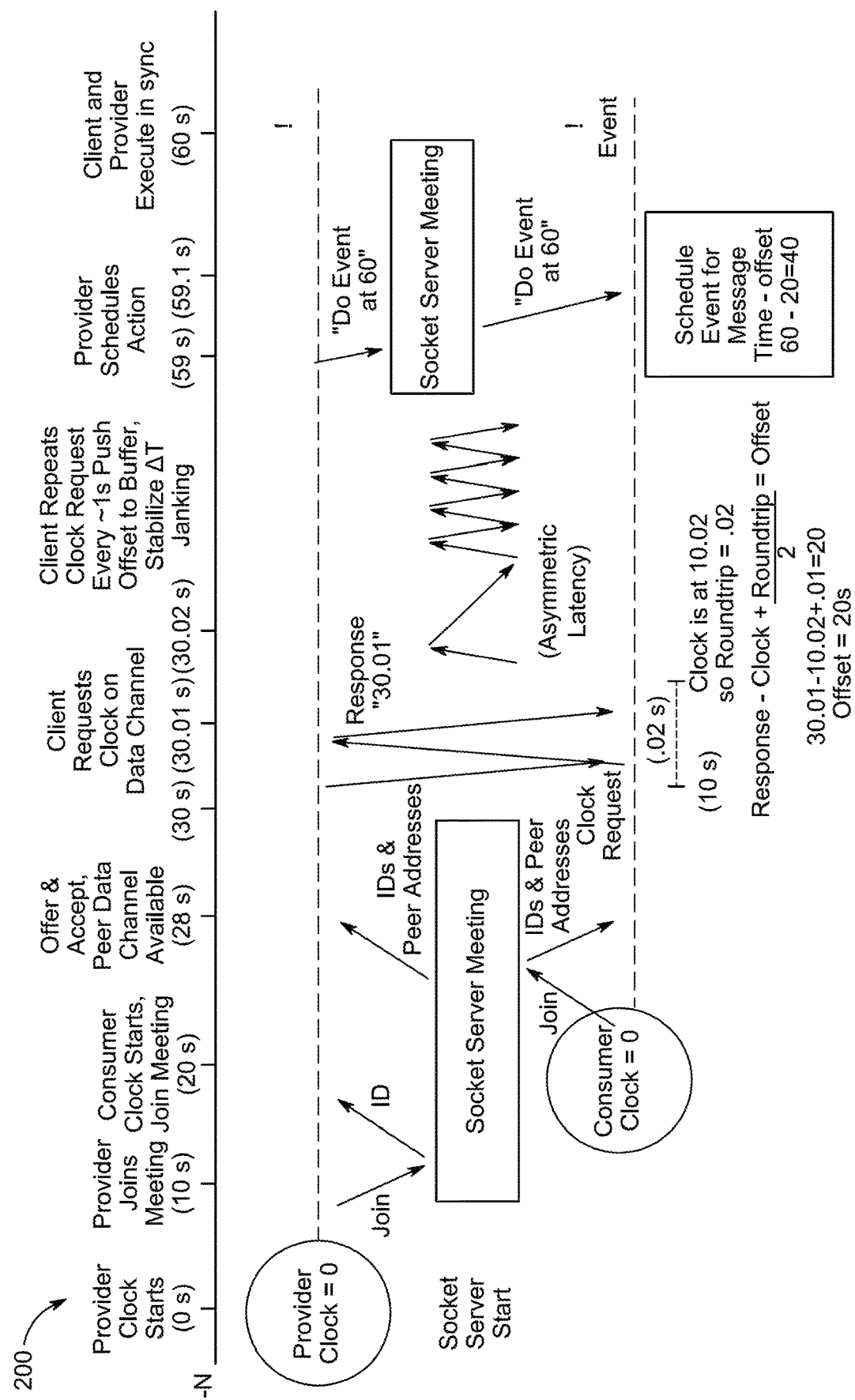
FIG. 2 is an example timing flow diagram for precise event scheduling with a high-latency scheduling server in accordance with a number of embodiments of the present disclosure.

FIG. 2 illustrate an example timing flow diagram 200 for precise event scheduling with a high-latency scheduling server. It is noted that the specific times enumerated below are merely illustrative examples and not intended to be limiting in any way to the embodiments of the disclosure contemplated herein. At some arbitrary time ("0 s"), a provider clock is initiated. At a subsequent time (e.g., at "10 s"), a provider joins the socket server meeting.

At a subsequent time (e.g., at "20 s"), a consumer clock is initiated and a consumer device (e.g., a client device) joins the meeting. In some embodiments, when the consumer clock is initiated, the consumer clock may initiate with an arbitrary time of "0 s," as shown where the "consumer clock=0." As illustrated, the consumer clock can perform operations to join the socket server meeting and/or request identification information (e.g., "IDs & Peer Addresses) as part of joining the socket server meeting at a time subsequent to when the "consumer clock=0."

Subsequently, (e.g., at time "28 s"), a negotiation in which usage of a data channel for peer-to-peer network communication can be performed. The client device may then request clock signals (e.g., clock information or timestamps) via the data channel at, for example, "30 s," "30.01 s," "30.02 s," etc. During this non-limiting example time interval, there may be a difference of 0.02 seconds that may be added to the 10 seconds that has transpired once the consumer clock is initialized at "0 s" versus when the provider clock was initialized at "0 s." In this non-limiting illustrative example, an offset can be determined in accordance with Equation 1, below.

$$\text{Response} - \text{Clock} + \frac{\text{Roundtrip}}{2} = \text{Offset} \qquad \text{Equation 1}$$

In the particular illustrative example described above, the "Response" (e.g., the time elapsed since the initiation of the provider clock) can be 30.01 seconds, the "Clock" (e.g., the consumer or client clock) can be 10.02 seconds, and the "Roundtrip" (e.g., the latency between the client device requesting the clock signals) can be 0.02 seconds. Using Equation 1 with these inputs, the "Offset" is in this example is then equivalent to 20 seconds.

During a subsequent time period, the client can request clock information at regular or irregular intervals. For example, the client can request clock information at intervals of approximately one second and/or the client can request clock information at intervals of approximately a partial second (e.g., half a second, a quarter of a second, etc.), and/or the client can request clock information in irregular intervals, such as approximately one second followed by a clock request half a second later followed by a clock information request one and a half second later, etc. It will be appreciated that these example time periods are merely illustrative, and the client can request clock information at any interval, whether regular or irregular.

During operations performed where the client requests the clock information (e.g., at "30 s," "30.01 s," "30.02 s," etc. shown in one or more Figures herein), any time offset detected can be pushed (e.g., written) to a buffer, as mentioned above. As described in more detail, herein, fluctuations to offset timings or "ΔT" (where "T" represents a time that may reflect a deviation from a predicted time or expected time) can be pushed to one or more buffers in order to stabilize janking effects that may result from the presence of the ΔT fluctuations versus time or timestamp that fails to take into consideration latencies and/or fluctuations in an "actual" time that result from inherent behaviors of networks and/or devices connected to such networks.

At yet another subsequent period in time (e.g., at "59.0 s," "59.1 s," etc.), the provider can schedule an event. In this particular example (e.g., in which the provider schedules an event described above at the time period "59.0 s," "59.1 s," etc.), performance of the event can be scheduled to occur at "60 s." For example, the socket server meeting can schedule performance of an event at "60 s" in this example. As shown in one or more Figures herein, the event can be scheduled utilizing an offset latency in connection with precise event scheduling with a high-latency scheduling server described herein.

For example, if the event is scheduled to occur at 60 seconds subsequent to initialization of the provider clock and the Offset calculated using Equation 1 is 20 seconds, the socket server meeting can schedule an event for 40 seconds after the provider clock is initialized (i.e., 60 seconds since initialization of the provider clock minus the 20 seconds for latencies associated with the consumer clock given by Equation 1).

Stated alternatively embodiments herein contemplate scenarios in which Two or more devices are running web browser, ideally on the same Wi-Fi network. Each browser has WebAudio API precision clock running. Each devices' clock is 0 when initialized, an arbitrary time.

The browsers are signed into a CMS at a web page authenticating a socket server meeting connection. Socket server round trip time is ~150 ms.

One client is the clock provider and will schedule events to be executed at as close to the same time as possible in all clients. Consumer clients join the socket server meeting then provide ICE peer info over the socket connection. The WebRTC data channel is negotiated. WebRTC Data Channel round trip time is ~10 ms when on the same Wi-Fi.

Consumer requests a clock value from the provider client. The returned value is compared to the consumer audio precision clock. The resulting offset is adjusted for the measured round trip latency.

A timer causes the clock request to re-occur at a set time. The offset calculated from the response is added into a buffer of a fixed length discarding oldest first. The buffer is averaged to create a "best guess offset." Outlying values are ignored to reject fast fluctuations in reported time caused by occasional asymmetric latency. The document is displayed with the now indicator of the timeline in synch across devices.

Provider sends clients socket messages to specify upcoming events. The "best guess offset" is subtracted from the scheduled time specified by the provider. All clients execute the scheduled event within the least time variation possible.

Delayed clock messages can cause an artifact of 2 equal and opposite wrong offset values in sequence. The actual hardware clocks on either device are not slipping so expected values resume immediately after the two artifacts. The high and low values are sorted and culled allowing both aberrant artifact values to pass the buffer without janking audio scheduling or animation.

A non-limiting example of stabilization of janking that may occur as a result of ΔT is presented below. This non-limiting example is illustrative of the benefits of the precise event scheduling with a high-latency scheduling server described herein.

During the time period in which the client repeats clock requests described above, various latencies may be associated with each of said clock requests, noting that, in the foregoing example, those values that are the lowest and highest values are indicated by a bold font. For example, if a series of latencies detected for multiple such clock request is given by the following vector [20.1, 19.4, 20.8, 17.3, 23.5, 19.7, 20.0, 19.9, 20.3, . . . ], embodiments of the disclosure can allow for a certain quantity of entries to this vector to be stored. In this particular example, we may assume that six entries to this vector are stored as follows: [20.1, 19.4, 20.8, 17.3, 23.5, 19.7].

These entries may then be sorted from lowest to highest values, for example: by the following vector [17.3, 19.4, 19.7, 20.1, 20.8, 23.5]. Embodiments are not so limited, however, and the entries may be sorted, for example, from a highest to lowest value.

In some embodiments, the highest and lowest values from the sorted vector may be culled (e.g., removed or otherwise cast aside) to yield a truncated vector that does not include the outlying (e.g., highest and/or lowest) values detected during the aforementioned clock requests. In this particular example, performing such an operation (e.g., an operation to stabilize janking that may occur as a result of ΔT) yields the following vector: [19.4, 19.7, 20.1, 20.8].

Continuing with this non-limiting example, an average of the values of the vector [19.4, 19.7, 20.1, 20.8] yields a "best guess offset" value of 20 seconds, as described above in connection with one or more of the preceding Figures.

Figure 3:
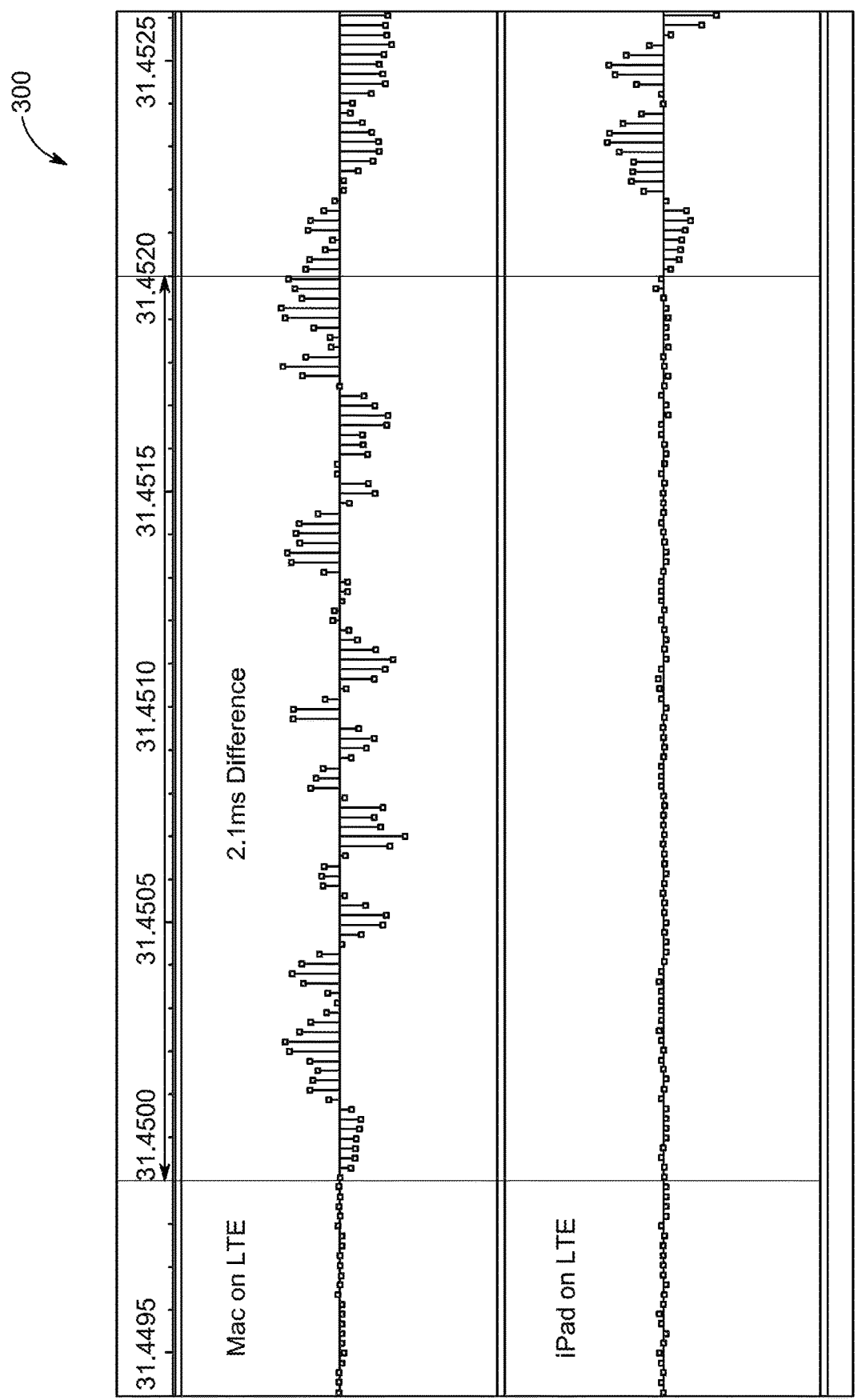
FIG. 3 is an example plot for precise event scheduling with a high-latency scheduling server in accordance with a number of embodiments of the present disclosure.

FIG. 3 illustrates an example plot 300 for precise event scheduling with a high-latency scheduling server in accordance with a number of embodiments of the present disclosure.

The Y-axis is speaker excursion from rest. The X-axis is time. Each is an audio sample. 44.1/second (44.1 Hz). LTE is cell phone type connection. Left highlight is delay. A result of the action of an event that was scheduled at future time is shown. The host device is indicated as the "MAC" and the client device is indicated as the "iPAD."

Figure 4:
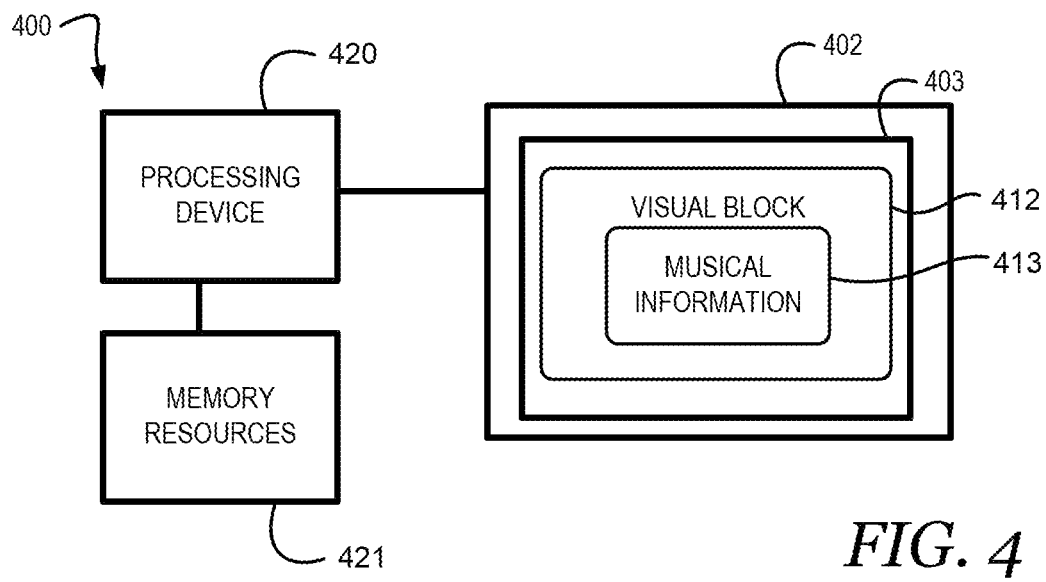
FIG. 4 is a diagram illustrating an apparatus including a display device and graphical user interface to display musical and graphic information in accordance with a number of embodiments of the present disclosure.

FIG. 4 illustrates a diagram illustrating an apparatus 400 including a display device 402 and graphical user interface (GUI) 403 to display musical and graphic information in accordance with a number of embodiments of the present disclosure. The apparatus 400 can be a computing device, such as a personal computer, a laptop, a tablet, a smartphone, a phablet, internet-of-things enabled device, or other computing device that includes a processing device 420 and memory resources 421 (e.g., volatile and/or non-volatile memory resources). In addition to, or in the alternative, the apparatus 400 can be coupled to a software defined data center and can therefore be configured to perform the embodiments described herein as a software as a service. As used herein, an "apparatus" can refer to, but is not limited to, any of a variety of structures or combinations of structures, such as a circuit or circuitry, a die or dice, a module or modules, a device or devices, or a system or systems, for example.

The display device 402 can be a television, computer monitor, instrument panel, or other device that displays information. Non-limiting examples of display devices include cathode ray tube (CRT) displays, liquid-crystal displays (LCDs), organic light-emitting diode (OLED) displays, active-matrix organic light-emitting diode (AMO-LED) displays, etc. The display device 402 can be configured to display the GUI 403, as described in further detail, herein.

In some embodiments, the GUI 403 can be generated and/or displayed on the display device 402 through the execution of instructions processed by the processing device 420. For example, the processing device 420 can be configured to execute instructions that can cause the GUI 403 can be generated and/or displayed via the display device 402. The instructions can be executed in response to commands received by the processing device 420 in response to a user input. In this manner, a user can, for example, enter commands via a keyboard, touchpad, pointing device, voice detection device, microphone, MIDI controller, or other peripheral computing device and/or Internet-of-Things device to cause the instructions to be executed by the processing device 420 to cause the GUI 403 to be displayed via the display device 402. In addition, the commands can include commands that can cause the GUI 403 to be modified, altered, or otherwise selectively displayed as described in more detail, herein.

Figure 5A:
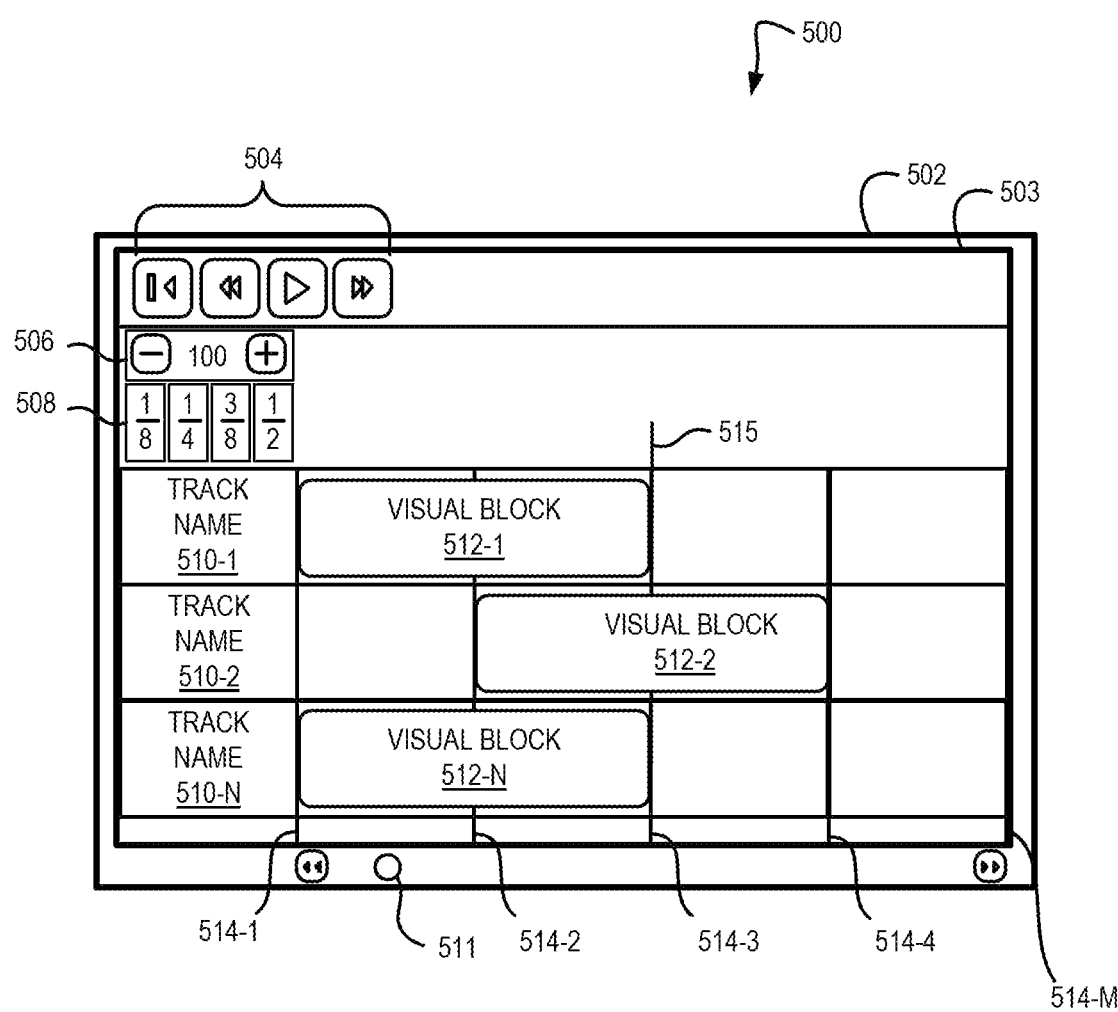
FIG. 5A is another diagram illustrating an apparatus including a display device and graphical user interface to display musical and graphic information in accordance with a number of embodiments of the present disclosure.

The GUI 403 can be configured to display a visual block 412 (or plurality of visual blocks, such as the plurality of visual blocks 512-1 to 512-N illustrated in FIG. 5A, herein). The visual block 412 can be formed from a quantity of pixels displayable on the display device 402. Accordingly, the visual block 412 can be movable, resizable, scalable or combinations thereof. For example, the visual block 412 can be "dragged" or resized in response to a command generated by a user input.

Figure 6:
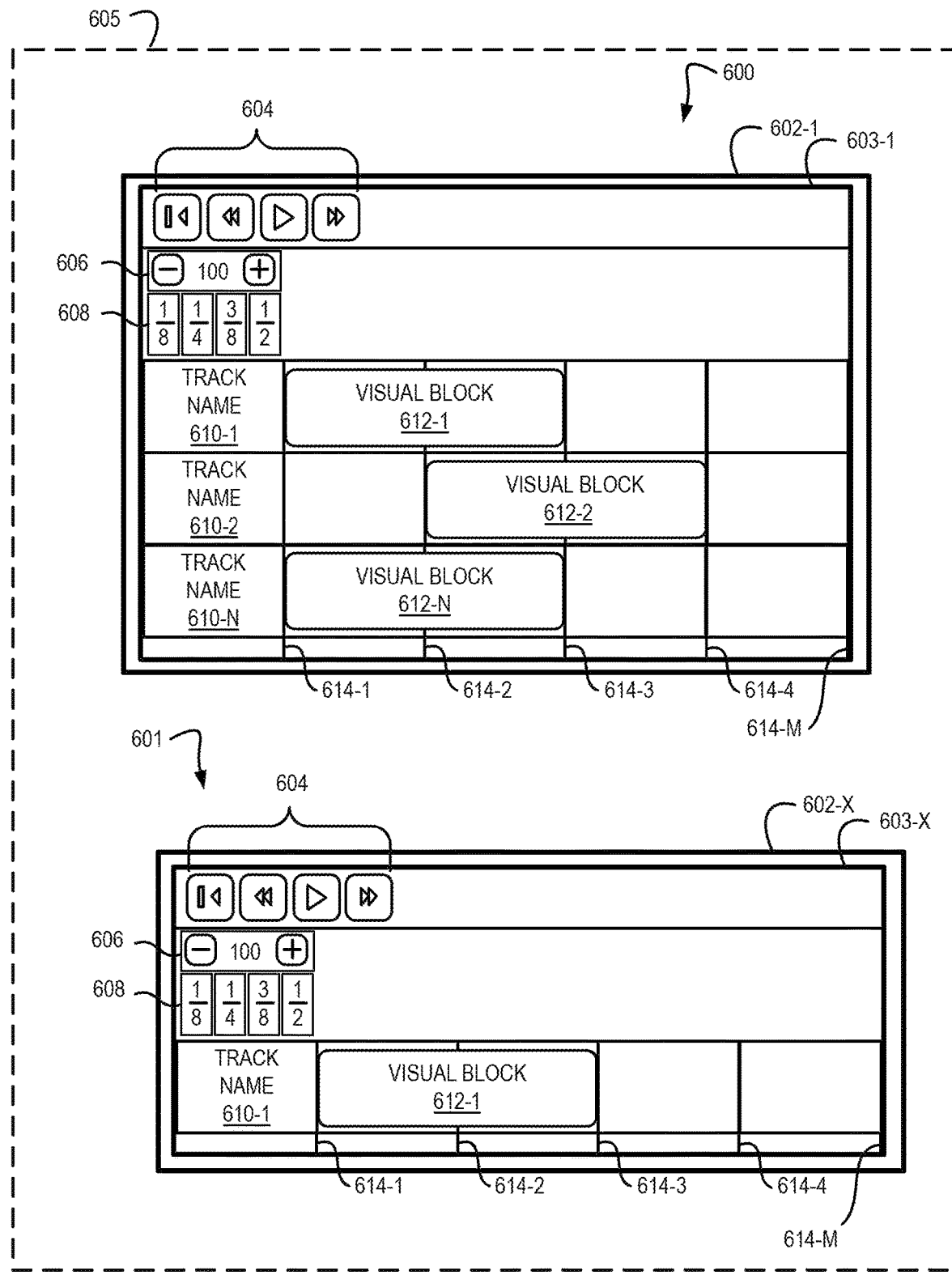
FIG. 6 is a diagram illustrating a system including a first graphical user interface (GUI) to display musical and graphic information and a second GUI to display musical and graphic information in accordance with a number of embodiments of the present disclosure.

In some embodiments, the visual block 412 can be generated within a plurality of bar lines (e.g., the bar lines 514-1 to 514-M illustrated in FIG. 5A and/or the bar lines 614-1 to 614-M illustrated in FIG. 6, herein). That is, in some embodiments, the visual block 412 can be generated in geometric order within an insulated border. However, embodiments are not so limited, and the visual block 412 can be generated such that only a portion of the visual block 412 falls between two or more consecutive bar lines (e.g., between the bar lines 514-2 and 514-3, between the bar lines 514-1 and 514-3, etc. illustrated in FIG. 5A) and/or the visual block 412 can be "dragged" or resized such that only a portion of the visual block 412 falls between two or more consecutive bar lines. As used herein, "bar lines" generally refer to vertical lines used to divide a musical staff into measures. In some non-limiting examples, the bar lines can be independent from a musical composition as a whole and therefore serve to divide musical information into measures or the bar lines can connect one or more musical staves throughout a musical composition (e.g., the bar lines can be systemic bar lines).

The visual block 412 can be resized, deleted, and/or moved in response to input received by the GUI 403. In some embodiments, a color of the visual block 412 can be selectively altered and/or text displayed within the visual block 412 can be added, deleted, and/or formatted, etc.

In some embodiments, the visual block 412 can include musical information 413. For example, the visual block 412 can be configured to display the musical information 413. The musical information 413 can be caused to be selectively displayed within the visual block 412, and hence, via the GUI 403, in response to commands received by the processing device 420.

The musical information 413 can include images, musical notes (e.g., standard musical notation and/or tablature), words (e.g., song lyrics, arrangement cues, memory aids, etc.), colors, or combinations thereof. In embodiments in which images are displayed as part of the musical information 413, the images can be generated and selectively displayed via user commands and can include chord diagrams, Musical Instrument Digital Interface (MIDI) information (e.g., MIDI trigger information corresponding to digital instruments, lights, videos, etc.), chord charts, audio tracks, etc. The images can be stored and/or displayed in various image formats, such as the Joint Photographic Experts Group (JPEG) format, Portable Networks Graphics (PNG) format, Graphics Interchange Format (GIF), among other image formats. In addition, in some embodiments, the musical information 413 can include video or motion picture information that can be displayed during live playback and/or recorded playback of the visual block(s) 712. Such video information can be stored and/or displayed in various formats, such as AVI, Advanced Systems Format (.asf), Flash Video (.flv), Windows Media Video (.wmv), or any other format that can store and/or display video information.

In some embodiments, the musical information 413 can be selectively configured to display information that is relevant to a particular user of the GUI 403. In a non-limiting example in which the user of the GUI 403 is a musician utilizing embodiments of the present disclosure to perform live music, the musician can selectively configure the information that is included within the musical information 413 to be displayed within the visual block 712 to include only information that the musician wishes to see displayed. This example is continued below in connection with FIG. 6.

FIG. 5A illustrates another diagram illustrating a computing device 500 (e.g., an apparatus) including a display device 502 and graphical user interface (GUI) 503 to display musical and graphic information in accordance with a number of embodiments of the present disclosure. The display device 502 and the GUI 503 can be analogous to the display device 402 and the GUI 403 illustrated in FIG. 4, herein.

As shown in FIG. 5A, the GUI 503 can include a transport bar 504, a tempo control portion 506, a subdivision portion 508, and a zoom portion. It is noted that the transport bar 604, the tempo control portion 606, and the subdivision portion 608 of FIG. 6 are analogous to these similarly numbered elements in FIGS. 5A and 5B. The transport bar 504 can include icons that correspond to various functionalities that can be control via the GUI 503. For example, the transport bar 504 can include a "play" icon, a "fast forward" icon, a "rewind" icon, and/or a "stop" icon, among others. The icons associated with the transport bar 504 can be actuated (e.g., "clicked" using a pointing device) by a user to cause instructions executed by the computing device 500 to perform the action associated with the icon. Embodiments are not so limited, however, and in some embodiments, the icons associated with the transport bar 504 can be actuated in response to keyboard commands (or other commands input to a peripheral computing device), voice commands, and/or touchscreen commands, among others. In some embodiments, the GUI 503 can include icons that can allow tracks to be hidden and/or deleted.

The GUI 503 includes a tempo control portion 506. For example, by actuating the "+" icon of the tempo control portion 506, the tempo at which the visual blocks 512-1 to 512-N scroll across the GUI 503 can be increased. Conversely, by actuating the "−" icon of the tempo control portion 506, the speed, which may be referred to herein in the alternative as appropriate given the context as the "tempo," at which the visual blocks 512-1 to 512-N scroll across the GUI 503 can be decreased. In some embodiments, the tempo control portion 506 can be set such that different musical bars can have different tempos associated therewith. The scrolling functionality of the GUI 503 and/or the visual blocks 512-1 to 512-N is described in more detail in connection with FIGS. 7A-7C, herein.

The icons associated with the subdivision portion 508 of the GUI 503 can be actuated by a user to control a quantity of subdivisions with a particular musical bar or block of musical information contained within the visual blocks 512-1 to 512-N. In some embodiments, the icons of the subdivision portion 508 can be actuated to control a quantity of notes or beats within a particular bar or set of bars of music. Stated alternatively, the icons of the subdivision portion 508 can be selectively actuated to control a resolution of an audible click track that can be reproduced by the apparatus 400 (e.g., a computing system).

For example, if the "⅛" icon is selected on the subdivision portion 508 of the GUI 503, a click track (e.g., a series of audio and/or visual cues that can be used to synchronize sound recordings and/or be synchronized to one or more moving images, such as the visual blocks 512-1 to 512-N) that can be reproduced by the computing system during execution of the GUI 503 can play at a speed that corresponds to the reproduction of eighth notes. Similarly, if the "¼" icon is selected on the subdivision portion 508 of the GUI 503, a click track that can be reproduced by the computing system during execution of the GUI 503 can play at a speed that corresponds to the reproduction of quarter notes.

Figure 7A:
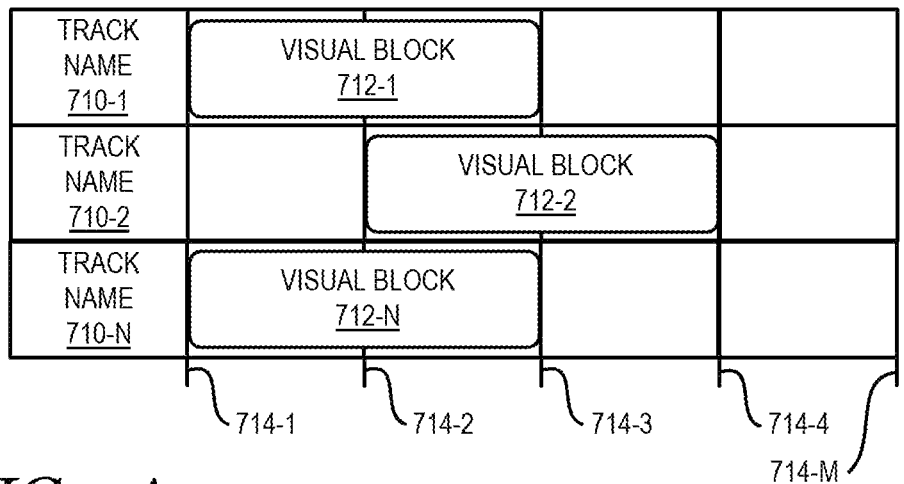
FIGS. 7A-7C are diagrams illustrating visual blocks of a graphical user interface to display musical and graphic information over time.
Figure 7B:
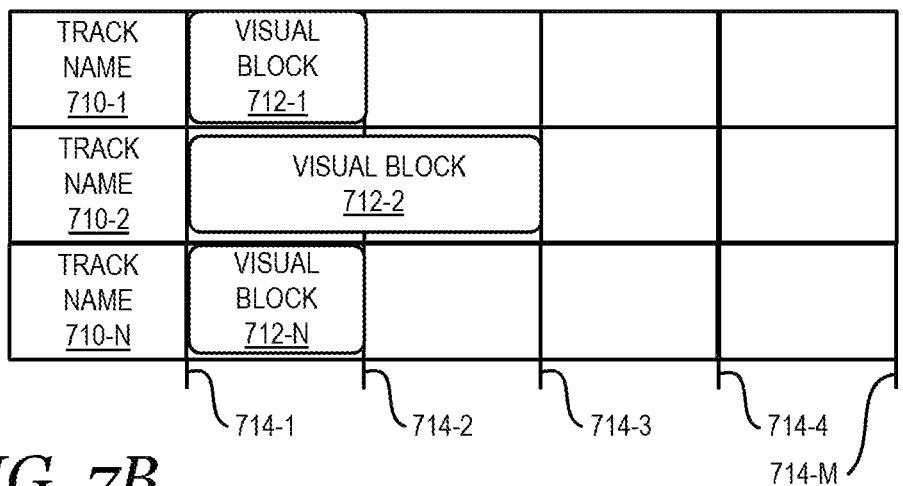
Figure 7C:
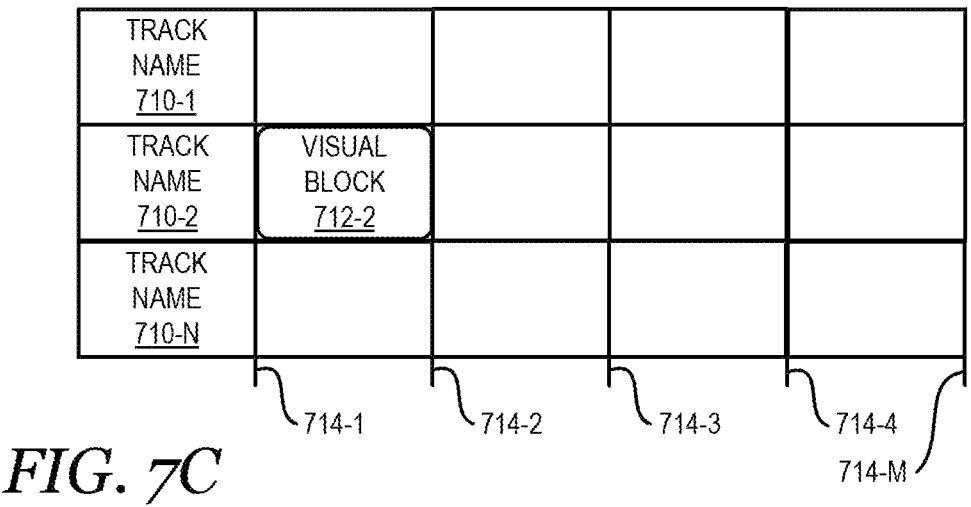

The zoom portion 511 can be actuated by a user to alter a display size of the track names 510-1 to 510-N (which can be analogous to the track names 610-1, 610-2, to 610-N of FIG. 6 and the track names 710-1, 710-2, to 710-N of FIGS. 7A-7C) and/or a display size of the visual blocks 512-1 to 512-N. For example, by moving or dragging the zoom control portion 511 in a first direction, a display size of the track names 510-1 to 510-N and/or the display size of the visual blocks 512-1 to 512-N can be increased thereby showing higher detail of the data contained within the track names 510-1 to 510-N and/or the visual blocks 512-1 to 512-N while showing fewer track names 510-1 to 510-N and/or visual blocks 512-1 to 512-N within the GUI 503. Conversely, by moving or dragging the zoom portion 506 in a second direction, the display size of the track names 510-1 to 510-N and/or the display size of the visual blocks 512-1 to 512-N can be decreased thereby showing lower detail of the data contained within the track names 510-1 to 510-N and/or the visual blocks 512-1 to 512-N while showing a greater quantity of track names 510-1 to 510-N and/or visual blocks 512-1 to 512-N within the GUI 503.

The track names 510-1 to 510-N can be configured to provide labels that correspond to respective visual blocks 512-1 to 512-N and/or musical information (e.g., the musical information 413 illustrated in FIG. 4, herein) contained in the respective visual blocks 512-1 to 512-N. In some embodiments, text or other information described within the track names 510-1 to 510-N can include identifying information for one or more parts of a musical composition that a user intends to perform.

For example, the track names 510-1 to 510-N can describe the musical information contained in each visual block 512-1 to 512-N for each track displayed by the GUI 503. The track names 510-1 to 510-N can be selectively named to provide additional functionality to the GUI 503 that can assist a user in manipulating the GUI 503. For example, one of the track names (e.g., the track name 510-1) can be named "GUITAR" to clarify that the visual block that corresponds to the track name (e.g., the visual block 512-1) displays musical information that is relevant to a user that is concerned with what a guitar player may be playing. Similarly, one of the track names (e.g., the track name 510-2) can be named "VOCALS" to clarify that the visual block that corresponds to the track name (e.g., the visual block 512-2) displays musical information that is relevant to a user that is concerned with what may be relevant to a vocalist during a musical performance.

In some embodiments, the GUI 503 can be provided to a person who is not part of the musical ensemble (e.g., to an audience member). In such embodiments, the visual blocks 512-1 to 512-N can contain visual information, such as text, images, video, graphics, etc. In embodiments in which the GUI 503 is provided to, for example, an audience member, the audience member can access the GUI 503 as a SaaS and the GUI 503 can be configured to display text (e.g., lyrics to a song being played by the musical ensemble), images and/or video to accompany the song being played by the musical ensemble, games (e.g., trivia, fun facts, etc.) to accompany the song being played by the musical ensemble, etc. In at least one embodiment in which the GUI 503 is accessed by an audience member, the GUI 503 may be configured to not be editable or alterable by the audience member.

The visual blocks 512-1 to 512-N can include musical information (e.g., the musical information 413 illustrated in FIG. 4, herein). The musical information contained in each of the visual blocks 512-1 to 512-N can be the same or different. For example, in some embodiments, the visual block 512-1 can include images, the visual block 512-2 can include musical notation, while the visual block 512-N can include words, video, graphics, images, and the like. It will, however, be appreciated that this enumerated example is merely illustrative and the visual blocks 512-1 to 512-N can contain any combination of musical information described herein and/or can be devoid of musical information.

In some embodiments, the GUI 503 can further include bar lines 514-1, 514-2, 514-3, 514-4, to 514-M. As described above, the bar lines 514-1 to 514-M can correspond to a line that is used to divide a musical staff into measures. It is noted that these bar lines 514-1 to 514-M can be analogous to the bar lines 614-1, 614-2, 614-3, 614-4, to 614-M of FIG. 6 and/or the bar lines 714-1, 714-2, 714-3, 714-4, to 714-M of FIGS. 7A-7C. Further, as shown in FIG. 5A, the GUI 503 can include one or more markers 515 that can be used to mark specific locations within the GUI 503. The marker(s) 515 can be dragged or otherwise moved within the GUI 503 such that they can be positioned in particular locations within the GUI 503. In some embodiments, the marker(s) 515 can denote starting or ending positions within the GUI 503. Further, in some embodiments, the marker(s) 515 can be used to denote a portion of the musical arrangement that is displayed within the GUI 503 that can be "looped" (e.g., played repeatedly). In some embodiments, the portion of the musical arrangement can be "looped" in response to one or more commands.

The rate (e.g., the tempo) at which the GUI 503 displays or animates the visual blocks 512-1 to 512-N and/or the musical information contained within the visual blocks 512-1 to 512-N can be controlled automatically or via a user input.

Although the transport bar 504, the tempo control portion 506, subdivision portion 508, the zoom control portion 511, the track names 510-1 to 510-N, the visual blocks 512-1 to 512-N, and/or the bar lines 514-1 to 514-M are shown in particular locations and in a particular orientation within the GUI 503, it will be appreciated that embodiments are not limited to the specific layout and/or spatial arrangement illustrated in FIG. 5A. In contrast, FIG. 5A is provided to illustrate aspects of the present disclosure and provide the reader with a visual guide of an example of a GUI 503 in accordance with embodiments of the present disclosure. Accordingly, it will be appreciated that changes may be made to the location(s), arrangement(s), and/or orientation(s) of the transport bar 504, the tempo control portion 506, the subdivision portion 508, the zoom control portion 511, the track names 510-1 to 510-N, the visual blocks 512-1 to 512-N, and/or the bar lines 514-1 to 514-M without departing from the scope of the disclosure.

That is, although not explicitly shown in Figures, the GUI 503 can include different types of icons and/or icons that have different shapes than are shown in the Figures. For example, a speaker-shaped icon may be included in the GUI 503 to identify a type of selected track, an eyeball-shaped icon may be included in the GUI 503 to control hiding/showing of the selected track, an X-shaped icon may be included to the GUI 503 to simplify deletion of a selected track, an icon (e.g., a square-shaped icon with diagonal arrows contained therein) may be included in the GUI 503 to control toggling between full screen and minimized screen modes, and/or a person-shaped icon to control permissions associated with different users (e.g., what level of control each user is afforded with respect to modifying the musical information 413 and/or visual blocks 512), among others, may be included in the GUI 503. Further, various other functionalities may be included in the GUI 503, such as, but not limited to, volume controls, pan controls (e.g., control of which speakers are used to reproduce a particular track or instrument), audio/video input and/or output controls, etc. In addition, it will be appreciated that one or more of the transport bar 504, the tempo control portion 506, the subdivision portion 508, the zoom portion 511, the track names 510-1 to 510-N, the visual blocks 512-1 to 512-N, and/or the bar lines 514-1 to 514-M may be removed from the GUI 503 without departing from the scope of the present disclosure.

Figure 5B:
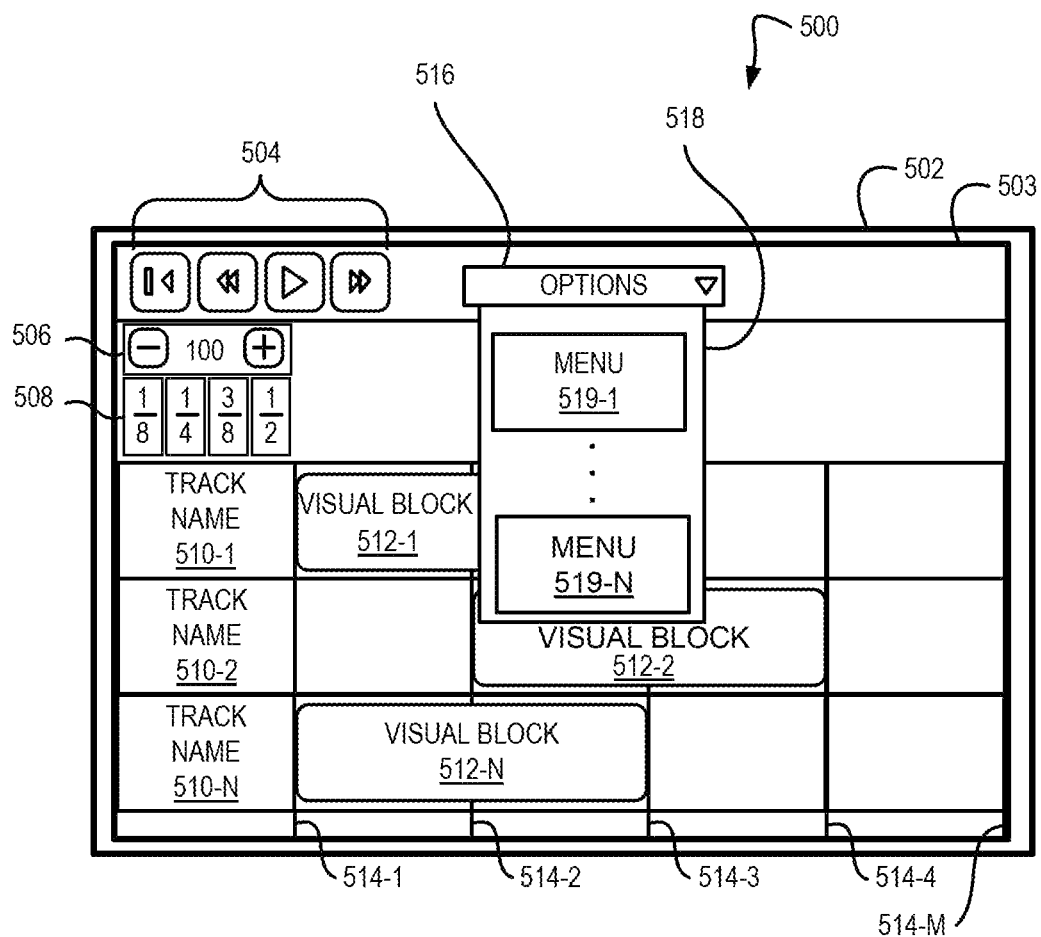
FIG. 5B is a diagram illustrating an apparatus including a display device, graphical user interface to display musical and graphic information, and menus in accordance with a number of embodiments of the present disclosure.

FIG. 5B illustrates a diagram illustrating an apparatus including a display device 502, graphical user interface 503 to display musical and graphic information, and menus 519-1 to 519-N in accordance with a number of embodiments of the present disclosure. The GUI 503, the transport bar 504, the tempo control portion 506, the subdivision portion 508, and/or the zoom portion 511 can be analogous to the GUI 503, the transport bar 504, the tempo control portion 506, and/or the subdivision portion 508 illustrated in FIG. 5A.

In the example shown in FIG. 5B, the GUI 503 can be provided with an options portion 516, which, when active, can cause a drop-down box 518 displaying a plurality of menus 519-1 to 519-N to be displayed by the GUI 503. The menus 519-1 to 519-N can correspond to features and/or functionality that can be implemented within the GUI 503. For example, the menus 519-1 to 519-N can allow for arrangement tagging of track names 510-1 to 510-N and/or the visual blocks 512-1 to 512-N, tagging of users and/or song filters, smart transpose functionality, set building features, stage access functionality, section repeat functionality, tempo control based on sections of the arrangement, lyric generation, and/or, set list generation, among others. Furthermore, in some embodiments, the menus 519-1 to 519-N can display a data hierarchy that can allow a user to locate and/or organize different musical ensembles, shows, set lists, and/or arrangements, as shown in one or more Figures, herein.

Arrangement tagging can include providing identifying information to musical arrangements. In some embodiments, the arrangement tagging can be generated by a user and/or can be machine implemented via machine-based song recognition. Non-limiting examples of tags that can be used to identify musical arrangements can include simple identifiers such as "80 s" (to refer to a specific time period), "female singers," "adult contemporary music," etc. In some embodiments, these tags can be filtered based on users of the GUI 503, set lists displayable by the GUI 503, etc.

The smart transpose functionality can allow for all the pitch and/or visual information displayed by the visual blocks 512-1 to 512-N to be adjusted up or down with a single parameter and/or command. This can allow for an entire composition to be shifted from one key to another, for example.

The set building feature can build or generate sets of musical arrangements. In some embodiments, the set building feature can use various musical composition parameters (e.g., arrangement tags, tempos, keys, set list time constraints, and/or other user defined parameters) to generate set lists that conform to specified criteria.

Stage access functionality refers to access to various musicians (and/or non-musicians, such as audience members) to the GUI 503. For example, a first user may generate one or more songs, set lists, show lists, and/or ensembles, and portions of each of these may be selectively accessible to other users. In a simplified, non-limiting example, a band leader may create an arrangement that includes each part of a song (e.g., a vocal part, a guitar part, a bass part, a drum part, etc.). In order to share the arrangement with other users, the stage access functionality may be invoked to allow only those users that are privy to the arrangement to have the arrangement displayed on their respective GUI 503. In some embodiments, the stage access functionality can be provided to the other users as a QR code, a one-time password, a cryptographic key, or by any other secure method. In some embodiments, different secure keys, codes, etc. can be provided to the users that allow access only to a particular subset of the overall arrangement. Embodiments are not so limited, however, and in some embodiments, various functionalities described herein can be provided or shared using unsecured methods of communication.

The generation of lyrics, set lists, etc. can be invoked to output information that is stored in conjunction with operation of the GUI 503. For example, a user may desire to output (e.g., print) a set list that was generated in connection with the set builder feature. In some embodiments, the menus 519-1 to 519-N can include an option to export such information in order for the user to view the information and/or print the information for use outside of the GUI 503.

FIG. 6 illustrates a diagram illustrating a system 605 including a first graphical user interface (GUI) 603-1 to display musical and graphic information and a second GUI 603-X to display musical and graphic information in accordance with a number of embodiments of the present disclosure. The GUI 603-1 and the GUI 603-X can be analogous to the GUI 403 illustrated in FIG. 4 or the GUI 503 illustrated in FIGS. 5A and 5B, herein. The GUIs 603-1 to 603-X can be generated by respective computing devices 600 and 601, which can be analogous to the computing devices 400 discussed in connection with FIG. 4, herein.

As shown in FIG. 6, a first GUI 603-1 can display a different quantity of visual blocks 612-1 to 612-N than the GUI 603-X. In some embodiments, the different quantity of visual blocks 612 displayed by the first GUI 603-1 and the second GUI 603-X can reflect different parts of a musical composition that are being played by different musicians in an ensemble. For example, the first GUI 603-1 can be used by a musician that requires more parts of a musical composition to be visible, while the second GUI 603-X can be used by a musician who requires fewer parts of the musical composition to be visible. It is noted that, in some embodiments, the first GUI 603-1 and the second GUI 603-X can be synchronized to one another with respect to at least of a time, a tempo, a bar, or other global parameter associated with a composition or arrangement being displayed by the first GUI 603-1 and/or the second GUI 603-X.

Continuing with the example of FIG. 4 in which the musician can selectively configure the information that is included within the musical information (e.g., the musical information 413 illustrated in FIG. 4) to be displayed within the visual block(s) 612-1 to 612-N to include only information that the musician wishes to see displayed, if the musician is playing lead guitar for a particular musical composition (e.g., a song), the musician may not care what parts of the particular composition other musicians in a musical ensemble are playing. In this example, the lead guitar player can selectively configure the musical information 613 such that the parts of the particular composition that are being performed by the other musicians are not visible to the lead guitar player.

In another non-limiting example in which the user of the GUI 403 is a musician utilizing embodiments of the present disclosure to perform live music, the musician may be a percussionist and may therefore care about certain parts of the particular composition other musicians in a musical ensemble are playing. In this example, the percussionist can selectively configure the musical information 413 such certain parts of the particular composition that are being performed by the other musicians are visible to the percussionist. For example, the percussionist may want to see information that includes the notes a bass guitar player or flautist are playing.

In yet another non-limiting example in which the user of the GUI 403 is a musician utilizing embodiments of the present disclosure to perform live music, the musician may be a conductor or band leader of the ensemble and may therefore care about all parts of the particular composition other musicians in a musical ensemble are playing. In this example, the conductor or band leader can selectively configure the GUI 403 such all parts (e.g., all tracks) of the particular composition that are being performed by the other musicians are visible to the conductor or band leader.

In a further non-limiting example in which the user of the GUI 403 is a musician utilizing embodiments of the present disclosure to perform live music, the musician may care about certain parts of the particular composition at different times and/or may care about certain parts of only certain compositions that may be performed during a live musical performance.

In yet another non-limiting example, a first computing device 600 can include a first display component 602-1 and a second computing device 601 can include a second display component 602-X. The first computing device 600 can be configured to receive a command to generate a plurality of configurable visual blocks 612-1 to 612-N each comprising a quantity of musical information (e.g., the musical information 413 illustrated in FIG. 4, herein) that is displayable in a first physical dimension and a second physical dimension with respect to the first display component 602-1 and selectively display a portion of the plurality of configurable visual blocks 612-1 to 612-N on the first display component 602-1.

Continuing with this example, in some embodiments the second computing device 601 can be configured to receive a combination of information from the first computing device 600 and a user input to selectively display a subset of the portion of the plurality of configurable visual blocks 612-1 on the second display component 602-X, wherein the portion of the plurality of configurable visual blocks 612-1 selectively displayed on the second display component have a first physical dimension and a second physical dimension with respect to the second display component 602-X. In some embodiments, the first physical dimension and the second physical dimension with respect to the first display component 602-1, the first physical dimension and the second physical dimension with respect to the second display component 602-X, or both can correspond to a tempo (e.g., a beats-per-minute parameter), a time signature, musical information, or combinations thereof. Stated alternatively, in some embodiments, particular bar lines 614-1 to 614-M of the first GUI 603-1 can, while the first GUI 603-1 and the second GUI 603-X are operating in a play mode, can line up with corresponding bar lines 614-1 to 614-M of the second GUI 603-X. For example, if the first GUI 603-1 is at the bar line 614-2, the second GUI 603-X may also be at the bar line 614-2.

Embodiments are not so limited, however, and in some embodiments, the second computing device 601 can be configured to directly receive a user input to selectively display a subset of the portion of the plurality of configurable visual blocks 612-1 on the second display component 602-X. In some embodiments, whether the second computing device 601 can receive input directly from a user (and to that extent that input can be used to manipulate the subset of the portion of visual blocks 612-1) can be based on permissions associated with the second computing device 601. That is, an amount of control allowed to a user of the second computing device 601 can be based on permissions granted to the user of the second computing device 601 by the first computing device 600.

In some embodiments, the first computing device 600, the second computing device 601, or both, can be configurable to control a tempo associated with display of the plurality of configurable visual blocks 612-1, 612-2, to 612-N, the subset of the plurality of configurable visual blocks 612-1, or the subset of the portion of the plurality of configurable visual blocks, or any combination thereof on the first display component 602-1, the second display component 602-X, or both.

Further, as described above, the musical information can include at least one of a time signature, a tempo, a musical tablature, a musical notation, an audio file, a lyric, an image file, and/or a Musical Instrument Digital Interface (MIDI) file, among other file types currently known or yet to be discovered, or any combination thereof.

In some embodiments, the first computing device 600, the second computing device 601, or both can be configured to cause the plurality of configurable visual blocks 612-1 to 612-N and the subset of the portion of the plurality of visual blocks 612-1 to be displayed on the first display component 602-1, the second display component 602-X, or both to move across the first display component 602-1, the second display component 602-X, or both in a scrolling fashion, as described below in connection with FIGS. 7A-7C.

In some embodiments, the first computing device 600 and/or the second computing device 601 can be configured to generate a file including the quantity of musical information and export the generated file according to a format determined based, at least in part, on a set of user generated parameters received by the first computing device, the second computing device, or both.

FIGS. 7A-7C6 illustrate diagrams illustrating visual blocks 712-1, 712-2, to 712-N of a graphical user interface (e.g., the GUI 503 illustrated in FIG. 5A, herein) to display musical and graphic information over time. Accordingly, an axis parallel to the horizontal with respect to some Figures represents time (e.g., points that fall farther to the right with the respect to some Figures represent a later point in time than those that fall to the left). For example, FIG. 7A illustrates the visual blocks 712-1 to 712-N at a first time, FIG. 7B illustrates the visual blocks 712-1 to 712-N at a second time, and FIG. 7C illustrates the visual blocks 712-1 to 712-N at a third time. Accordingly, FIGS. 7A-7C collectively represent the movement of the visual blocks 712-1 to 712-N while the GUI is in a "play" mode (e.g., when the play icon of the transport bar 504 illustrated in FIGS. 5A and 5B and as 604 in FIG. 6 is activated).

As shown in FIGS. 7A-7C, during operation of the GUI, the visual blocks 712-1 to 712-N can "scroll" toward the left side of the GUI. This can allow for a scrolling or streaming representation of musical information (e.g., the musical information 413 illustrated in FIG. 4, herein) contained within the visual blocks 712-1 to 712-N. The rate at which the visual blocks 712-1 to 712-N scroll (horizontally and/or vertically with respect to the GUI illustrated in the Figures) can be dictated by the tempo and/or the level of zoom selected for the GUI. As used herein, a "level of zoom" generally refers to a level of magnification applied to one or more of the visual blocks 712-1 to 712-N. For example, the zoom level can be increased to show more detail of the musical information (e.g., the musical information 413 illustrated herein) or decreased to show less detail of the musical information contained within the visual blocks 712-1 to 712-N. As will be appreciated, as the zoom is increased, fewer visual blocks 712-1 to 712-N may be displayed in the GUI and, conversely, as the zoom is decreased, a greater quantity of visual blocks 712-1 to 712-N may be displayed in the GUI.

Figure 8:
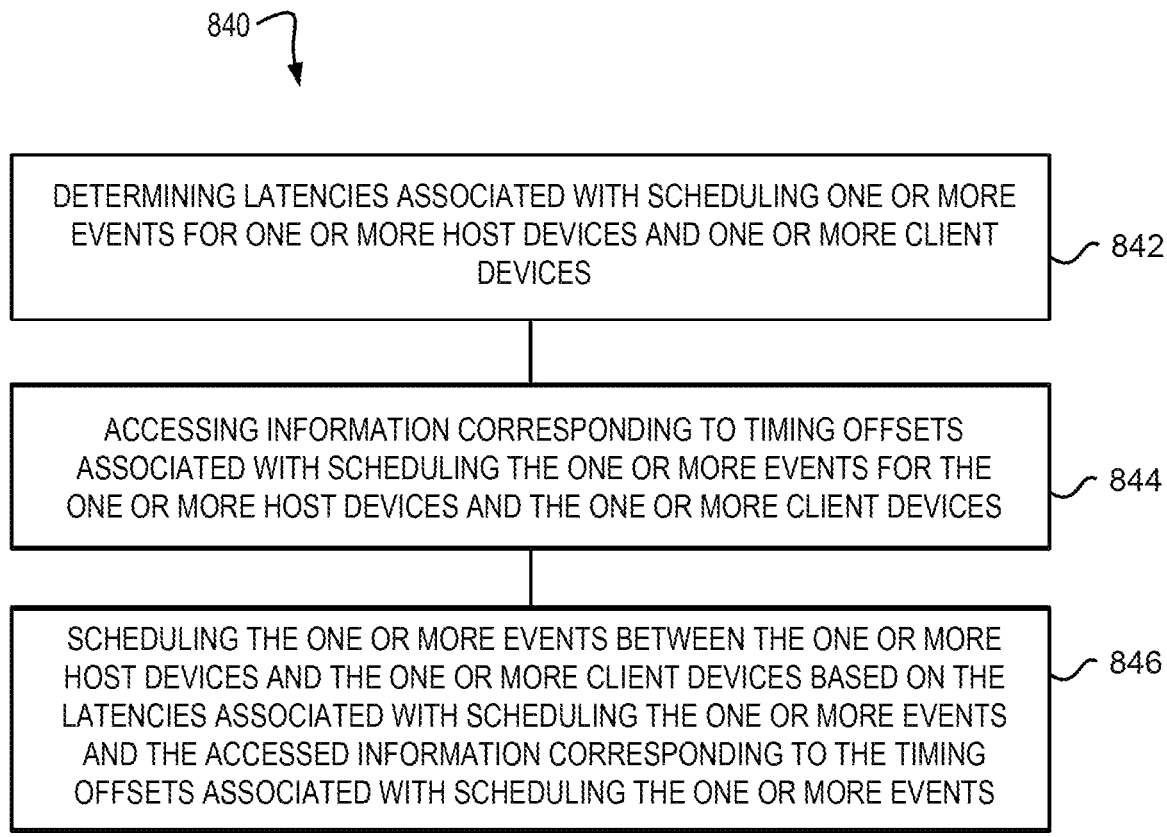
FIG. 8 is a flow diagram representing an example method for precise event scheduling with a high-latency scheduling server in accordance with a number of embodiments of the present disclosure.

FIG. 8 is a flow diagram representing an example method 840 for precise event scheduling with a high-latency scheduling server in accordance with a number of embodiments of the present disclosure. The method 840 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 842, the method 840 includes determining latencies associated with scheduling one or more events for one or more host devices and one or more client devices. The one or more host devices and the one or more client devices can be connected to a same network. The one or more host devices and/or the one or more client devices can be connected to a same Wi-Fi network.

In some embodiments, at least one of the one or more host devices comprises a first computing device including a display component and at least one of the one or more client devices comprises a second computing device including a display component communicatively coupled to the first computing device. The method 840 can further include displaying musical information to the display component of the first computing device and the display component of the second computing devices concurrently based on the scheduling.

At block 844, the method 840 includes accessing information corresponding to timing offsets associated with scheduling the one or more events for the one or more host devices and the one or more client devices. The method 840 can include determining the information corresponding to the timing offsets by determining fluctuations to expected timing offset. In some embodiments, the timing offset(s) are calculated according to Equation 1, above.

At block 846, the method 840 includes scheduling the one or more events between the one or more host devices and the one or more client devices based on the latencies associated with scheduling the one or more events and the accessed information corresponding to the timing offsets associated with scheduling the one or more events. In some embodiments, the method 840 includes stabilizing janking effects as part of scheduling the one or more events between the one or more host devices and the one or more client devices.

The method 840 can further include determining, for each of the one or more of the host devices or the one or more of the client devices, or both, a plurality of latencies associated with respective clock signals received by each of the one or more of the host devices or the one or more of the client devices, or both, organizing the latencies received by each of the one or more of the host devices or the one or more of the client devices, or both in a particular order, removing at least a latency that exhibits a highest latency value, and generating the determined latencies associated with scheduling the one or more events for the one or more of the host devices or the one or more of the client devices subsequent to removal of the latency that exhibits the highest latency value.

Embodiments are not so limited, however, and the method 840 can include determining, for each of the one or more of the host devices or the one or more of the client devices, or both, a plurality of latencies associated with respective clock signals received by each of the one or more of the host devices or the one or more of the client devices, or both, organizing the latencies received by each of the one or more of the host devices or the one or more of the client devices, or both in a particular order, removing at least a latency that exhibits a lowest latency value, and generating the determined latencies associated with scheduling the one or more events for the one or more of the host devices or the one or more of the client devices subsequent to removal of the latency that exhibits the lowest latency value.

Embodiments of the present disclosure can be stored on a non-transitory computer-readable medium, which can be executed by a processor (e.g., a processing device associated with one or more of the computing devices described herein). The non-transitory computer-readable medium can be hosted and/or executed in a "cloud" (e.g., in a software-defined data center) and therefore can, upon execution of the instructions cause a computing device to perform the operations described herein in the absence of downloading the instructions to the computing device (e.g., the non-transitory computer-readable instructions can be executed as a software as a service (SaaS). Embodiments are not so limited, however, an in some embodiments, the instructions or a portion thereof can be downloaded to the computing device and executed thereon.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   determining latencies associated with one or more events for one or more host devices and one or more client devices, wherein the one or more events comprise one or more actions to be executed at a specific time in response to a computer command, by:
      accessing information corresponding to timing offsets associated with the one or more events for the one or more host devices and the one or more client devices;
      determining, for each of the one or more of the host devices or the one or more of the client devices, or both, a plurality of latencies associated with respective clock signals received by each of the one or more of the host devices or the one or more of the client devices, or both;
      organizing the latencies received by each of the one or more of the host devices or the one or more of the client devices, or both in a particular order;
      removing at least a latency that exhibits a highest latency value;
      generating the determined latencies associated with executing the one or more events for the one or more of the host devices or the one or more of the client devices subsequent to removal of the latency that exhibits the highest latency value; and
   scheduling execution of the one or more events between the one or more host devices and the one or more client devices based on the determined latencies associated with the one or more events and the accessed information corresponding to the timing offsets associated with the one or more events.

2. The method of claim 1, wherein the one or more host devices and the one or more client devices are connected to a same network.

3. The method of claim 1, wherein the one or more host devices and the one or more client devices are connected to a same Wi-Fi network.

4. The method of claim 1, wherein:
   at least one of the one or more host devices comprises a first computing device including a display component, and
   at least one of the one or more client devices comprises a second computing device including a display component communicatively coupled to the first computing device, and wherein the method further comprises:
      displaying musical information to the display component of the first computing device and the display component of the second computing device concurrently based on the scheduling.

5. The method of claim 1, further comprising stabilizing janking effects as part of scheduling the one or more events between the one or more host devices and the one or more client devices.

6. The method of claim 1, determining the timing offsets by determining a response, a clock, and a roundtrip as follows:

$$[\text{Response} - \text{Clock}] + \frac{\text{Roundtrip}}{2} = \text{Offset}.$$

7. The method of claim 1, further comprising:
   determining, for each of the one or more of the host devices or the one or more of the client devices, or both, a plurality of latencies associated with respective clock signals received by each of the one or more of the host devices or the one or more of the client devices, or both;
   organizing the latencies received by each of the one or more of the host devices or the one or more of the client devices, or both in a particular order;
   removing at least a latency that exhibits a lowest latency value; and
   generating the determined latencies associated with scheduling the one or more events for the one or more of the host devices or the one or more of the client devices subsequent to removal of the latency that exhibits the lowest latency value.

8. The method of claim 1, further comprising determining the information corresponding to the timing offsets by determining fluctuations to expected timing offsets.

9. An apparatus, comprising:
   a client computing device comprising a processing device and a display component, the client computing device configured to:
   determine latencies associated with one or more events for one or more host devices, wherein the one or more host computing devices each comprise a respective processing device and a respective display component;
   determine latencies associated with executing one or more events for the client device, wherein the one or more events comprise one or more actions to be executed at a specific time in response to a computer command;
   access information corresponding to timing offsets associated with the one or more events for the one or more host computing devices and the client computing device;
   determine, for each of the one or more of the host computing devices or the client computing device, or both, a plurality of latencies associated with respective clock signals received by each of the one or more of the host computing devices or the client computing device, or both;
   organize the latencies received by each of the one or more of the host computing devices or the client computing device, or both, in a particular order;
   remove at least a latency that exhibits a highest latency value; and
   generate the determined latencies associated with executing the one or more events for the one or more of the host computing devices or the client computing device subsequent to removal of the latency that exhibits the highest latency value; and
   schedule execution the one or more events between the one or more host computing devices and the client computing device based on the determined latencies associated with the one or more events and the accessed information corresponding to the timing offsets associated with the one or more events.

10. The apparatus of claim 9, wherein the one or more host computing devices and the client computing device are connected to a same network.

11. The apparatus of claim 9, wherein the one or more host computing devices and the client computing device are connected to a same Wi-Fi network.

12. The apparatus of claim 9, wherein
   the host computing device is configured to:
   display musical information to the display component of the client computing device and the display component of the one or more host computing devices concurrently based on the scheduling.

13. The apparatus of claim 9, wherein the client computing device is configured to stabilize janking effects as part of scheduling the one or more events between the one or more host computing devices and the client computing device.

14. The apparatus of claim 9, wherein the one or more host computing devices are configured to stabilize janking effects as part of scheduling the one or more events between the one or more host computing devices and the client computing device.

15. The apparatus of claim 9, wherein the client device is configured to determine the timing offsets by determining a response, a clock, and a roundtrip as follows:

$$[\text{Response} - \text{Clock}] + \frac{\text{Roundtrip}}{2} = \text{Offset}.$$

16. The apparatus of claim 9, wherein the one or more host devices are configured to determine the timing offsets by determining a response, a clock, and a roundtrip as follows:

$$[\text{Response} - \text{Clock}] + \frac{\text{Roundtrip}}{2} = \text{Offset}.$$

17. The apparatus of claim 9, wherein the client computing device is configured to:
   determine, for each of the one or more of the host computing devices or the client computing device, or both, a plurality of latencies associated with respective clock signals received by each of the one or more of the host computing devices or the client computing device, or both;
   organize the latencies received by each of the one or more of the host computing devices or the client computing device, or both, in a particular order;
   remove at least a latency that exhibits a lowest latency value; and
   generate the determined latencies associated with the one or more events for the one or more of the host computing devices or the client computing device subsequent to removal of the latency that exhibits the lowest latency value.

18. A non-transitory, computer-readable medium storing instructions that, when executed by a processor, cause the processor to:
   determine latencies associated with one or more events for one or more host devices and one or more client devices, wherein the one or more events comprise one or more actions to be executed at a specific time in response to a computer command by:
   accessing information corresponding to timing offsets associated with the one or more events for the one or more host devices and the one or more client devices;

determining, for each of the one or more of the host devices or the one or more of the client devices, or both, a plurality of latencies associated with respective clock signals received by each of the one or more of the host devices or the one or more of the client devices, or both;

organizing the latencies received by each of the one or more of the host devices or the one or more of the client devices, or both in a particular order;

removing a latency that exhibits a highest latency value;

generating the determined latencies associated with executing the one or more events for the one or more of the host devices or the one or more of the client devices subsequent to removal of the latency that exhibits the highest latency value; and scheduling execution of the one or more events between the one or more host devices and the one or more client devices based on the latencies associated with the one or more events and the accessed information corresponding to the timing offsets associated with the one or more events.

* * * * *